(12) United States Patent
Nishiyama et al.

(10) Patent No.: US 6,452,655 B1
(45) Date of Patent: *Sep. 17, 2002

(54) LIQUID CRYSTAL DEVICE AND ITS MANUFACTURING METHOD

(75) Inventors: Kazuhiro Nishiyama, Hirakata; Yukio Tanaka, Kusatsu; Kazunori Komori, Sanda; Akio Takimoto, Neyagawa, all of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/355,228
(22) PCT Filed: Jan. 19, 1998
(86) PCT No.: PCT/JP98/00174
§ 371 (c)(1),
(2), (4) Date: Jul. 26, 1999
(87) PCT Pub. No.: WO98/33092
PCT Pub. Date: Jul. 30, 1998

(30) Foreign Application Priority Data

Jan. 24, 1997 (JP) .............................. 9-010872
Dec. 3, 1997 (JP) .............................. 9-332608

(51) Int. Cl.[7] .......................... G02F 1/1331; G02F 1/13
(52) U.S. Cl. ...................................... 349/130; 349/181
(58) Field of Search ................................ 349/130, 143, 349/128, 181; 399/120, 178, 143

(56) References Cited

U.S. PATENT DOCUMENTS 4,492,432 A    1/1985  Kaufmann et al.
5,757,455 A  * 5/1998  Sugiyama et al. .......... 349/129
6,061,116 A  * 5/2000  Nishida et al. ............. 349/130

FOREIGN PATENT DOCUMENTS

| | | |
|---|---|---|
| EP | 0 337 493 | 10/1989 |
| EP | 0 559 137 | 9/1993 |
| JP | 2-53028 | 2/1990 |
| JP | 3-144420 | 6/1991 |
| JP | 4-116523 | 4/1992 |
| JP | 4-147216 | 5/1992 |
| JP | 4-261522 | 9/1992 |
| JP | 6-273772 | 9/1994 |

OTHER PUBLICATIONS

European search report for EP 98 90 0421 dated Aug. 24, 2001.

European search report for EP 93 10 3287 dated Oct. 28, 1993.

International Search Report for PCT/US94/06835 dated Aug. 9, 1994.

WO 95/00879 dated Jan. 5, 1995.

Hatoh H. et al. "Molecular Tilt Direction In a Slightly Tilted Homeotropic Aligned Liquid Crystal Cell", vol. 63, No. 26, Dec. 27, 1993, pp. 3577–3579, XP000416474.

* cited by examiner

Primary Examiner—Toan Ton
(74) Attorney, Agent, or Firm—Ratner & Prestia (57) ABSTRACT

The present invention is intended to eliminate any leakage of light which would occur, while in a black display state, due to a disordered alignment of liquid crystals around a pixel electrode in a liquid crystal device and to provide an improved contrast. The leakage of light around pixels can be suppressed and the contrast can be improved, for example, by rubbing the surface in a direction at an angle of 45 degrees with respect to any of the edges of a square pixel electrode 25 (a direction shown by the arrow 30) in a homeotropic type liquid crystal device.

7 Claims, 7 Drawing Sheets

LIQUID CRYSTAL DEVICE AND ITS MANUFACTURING METHOD

This application is U.S. National Phase application of PCT International Applicatoin PCT/JP98/00174.

TECHNICAL FIELD

The present invention relates to a liquid crystal display and a manufacturing method thereof, and in particular, to homeotropic and hybrid types of liquid crystal devices and manufacturing methods thereof.

BACKGROUND ART

Figure 5:
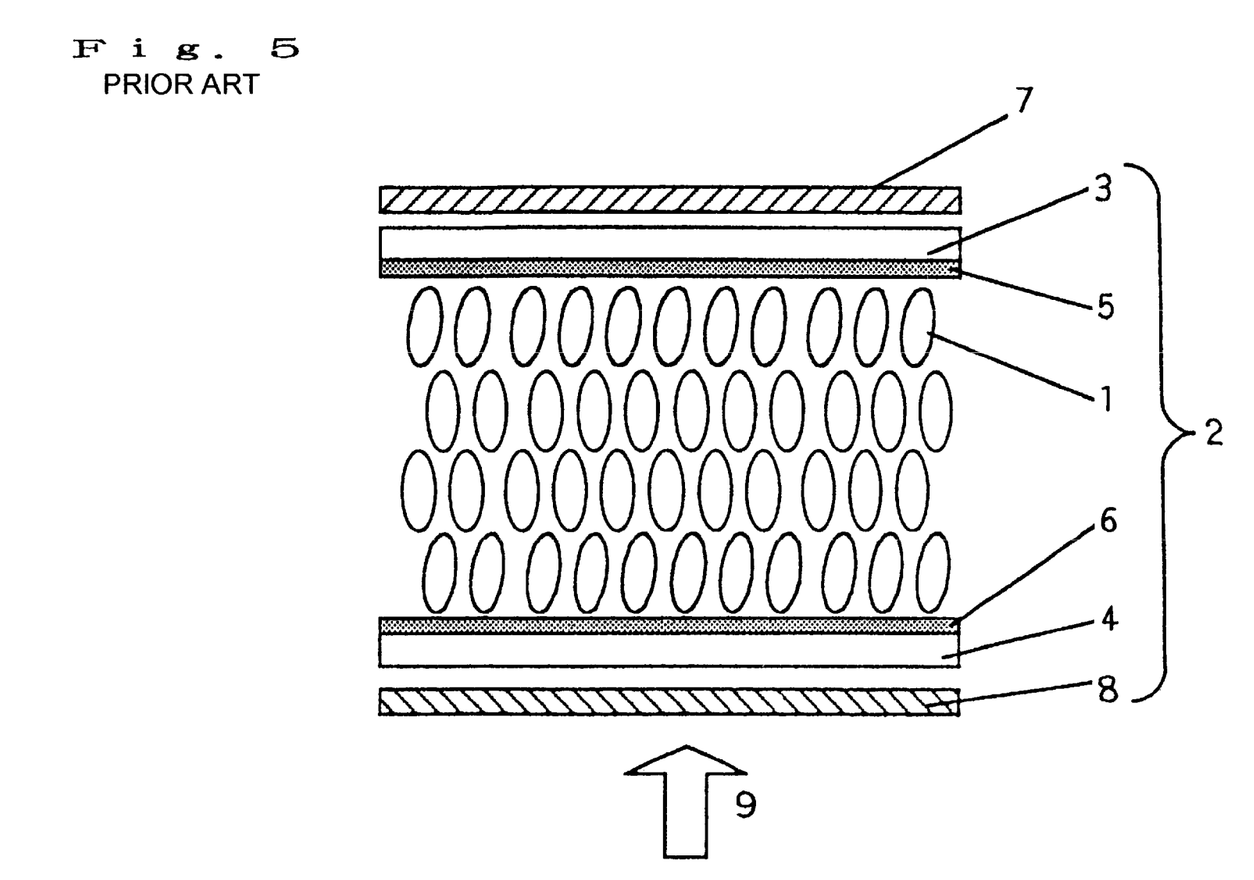
FIG. 5 is a schematic cross section showing a conventional homeotropic cell.

FIG. 5 shows the structure of a electrically controlled birefringence liquid crystal display cell. There are two types of liquid crystal display cells, that is, reflection and transmission; the transmission type will be described herein below as a typical one.

The configuration in FIG. 5 comprises a liquid crystal cell containing liquid crystal molecules 1 whose longitudinal axis is homeotropic-aligned, that is, aligned in a direction substantially perpendicular to the electrode surface.

In FIG. 5, a liquid crystal cell 2 includes two transparent glass substrates 3 and 4 oppositely arranged at a predetermined distance, transparent electrodes 5 and 6 formed on the opposite surfaces of the transparent glass substrates 3 and 4, respectively, and liquid crystals 1 sandwiched between the transparent electrodes.

There are placed, over and under the cell 2, polarizers 7 and 8 whose polarization directions are orthogonal to each other.

Incident light 9, when passing through the polarizer 8, is linearly polarized and then goes into the liquid crystal cell. In the proximity of the interface between the two substrates 3 and 4, the liquid crystal molecules are slightly tilted (pretilted) toward an appropriate direction through an alignment process in order to tilt the liquid crystal molecules uniformly in the plane.

If the slight tilt is ignored, the linearly-polarized incident light passes through the liquid crystal molecules 1 as it is, but it cannot pass through the polarizer 7 placed perpendicularly to the polarization axis of the polarizer 8, and thus the resulting display is in a dark state.

When a voltage higher than a predetermined threshold voltage is applied between the transparent electrodes 5 and 6, the alignment of the liquid crystal molecules 1 is tilted by the electric field to form a predetermined angle.

Accordingly, after going into the liquid crystal cell 2, the linearly-polarized incident light is doubly refracted into two components orthogonal to each other and then the polarized light having a component parallel to the polarization axis passes through the polarizer 7 to bring the display to a bright state.

At this time, a high contrast is achieved by placing both the two polarizers 7 and 8 at an angle of 45 degrees with respect to the tilt direction (pretilt direction) of the liquid crystal molecules.

Next, the structure of a hybrid liquid crystal cell will be described below.

Figure 6:
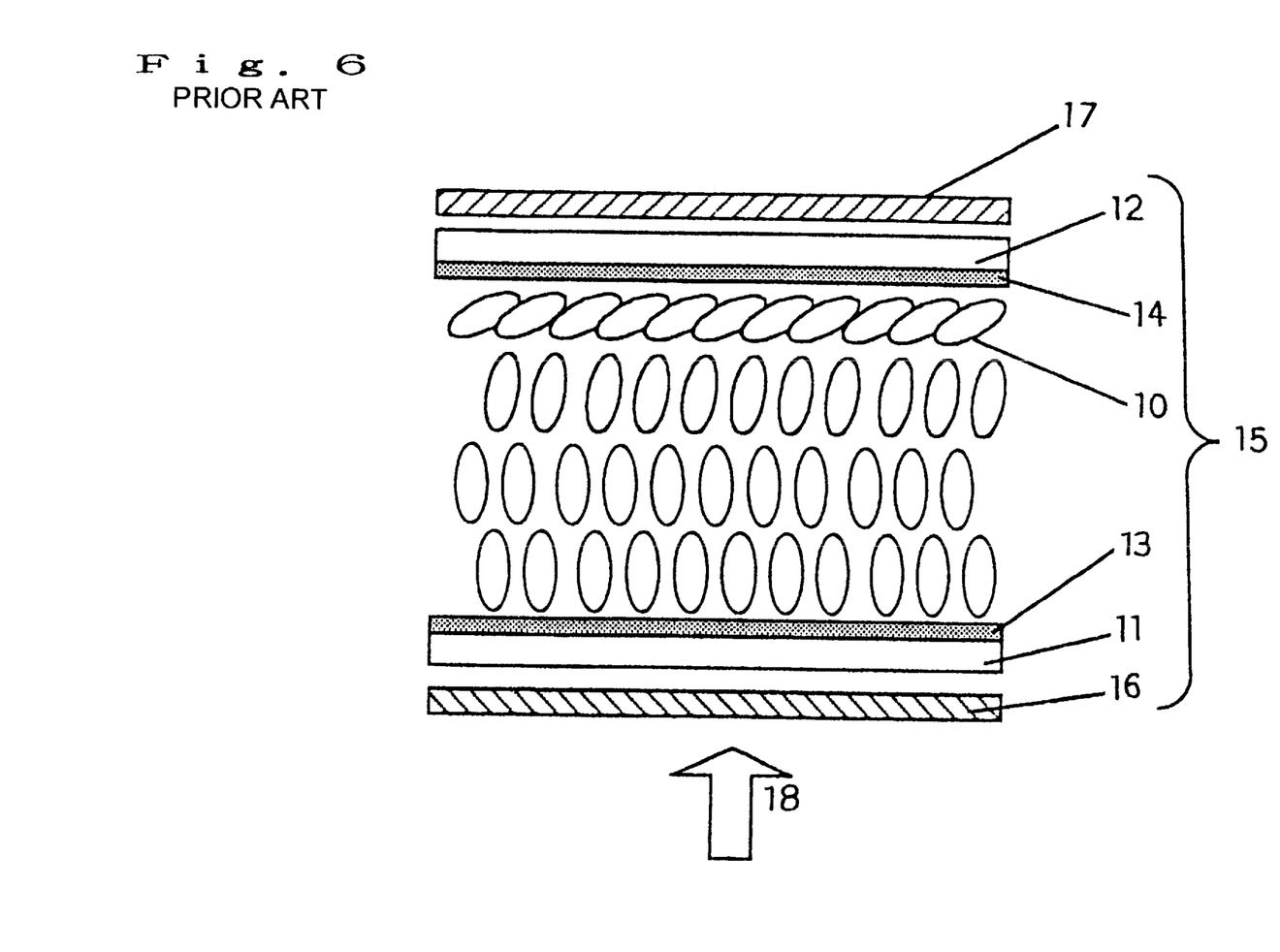
FIG. 6 is a schematic cross section showing a conventional hybrid cell.

The configuration in FIG. 6 exhibits a homeotropic alignment near a substrate 11 wherein the longitudinal axis of a liquid crystal molecule 10 is aligned in a direction substantially perpendicular to the surface of a transparent electrode 13 and a homogeneous alignment near another substrate 12 wherein the longitudinal axis of a liquid crystal molecule 10 is aligned in a direction substantially parallel to a transparent electrode 14.

In FIG. 6, a liquid crystal cell 15 includes two transparent glass substrates 11 and 12 oppositely arranged at a predetermined distance, transparent electrodes 13 and 14 formed on the opposite surfaces of the transparent glass substrates 11 and 12, respectively, and liquid crystals 10 sandwiched between the transparent electrodes 13 and 14.

There are placed, over and under the liquid crystal cell 15, polarizers 16 and 17 whose polarization directions are orthogonal to each other and the polarizers are placed in such a manner that both the polarization axes of these plates are at an angle of 45 degrees with respect to the homogeneous alignment near the glass substrate 12.

Incident light 18, when passing through the polarizer 16, is linearly polarized and then goes into the liquid crystals 10. The linearly-polarized incident light, which may be slightly subject to birefringence, passes through the liquid crystal molecules substantially as it is, but it can hardly pass through the polarizer 17 placed perpendicularly to the polarization axis of the polarizer 16, and thus the resulting display is in a dark state.

When a voltage higher than a predetermined voltage is applied between the transparent electrodes 13 and 14, the alignment of the liquid crystal molecules 10 is tilted by the electric field to form a predetermined angle.

Therefore, after going into the liquid crystal cell 15, the linearly-polarized incident light is doubly refracted into two components orthogonal to each other and then the polarized light having a component parallel to the polarization axis of the polarizer 17 passes through the polarizer 17 to bring the display to a bright state.

Figure 7:
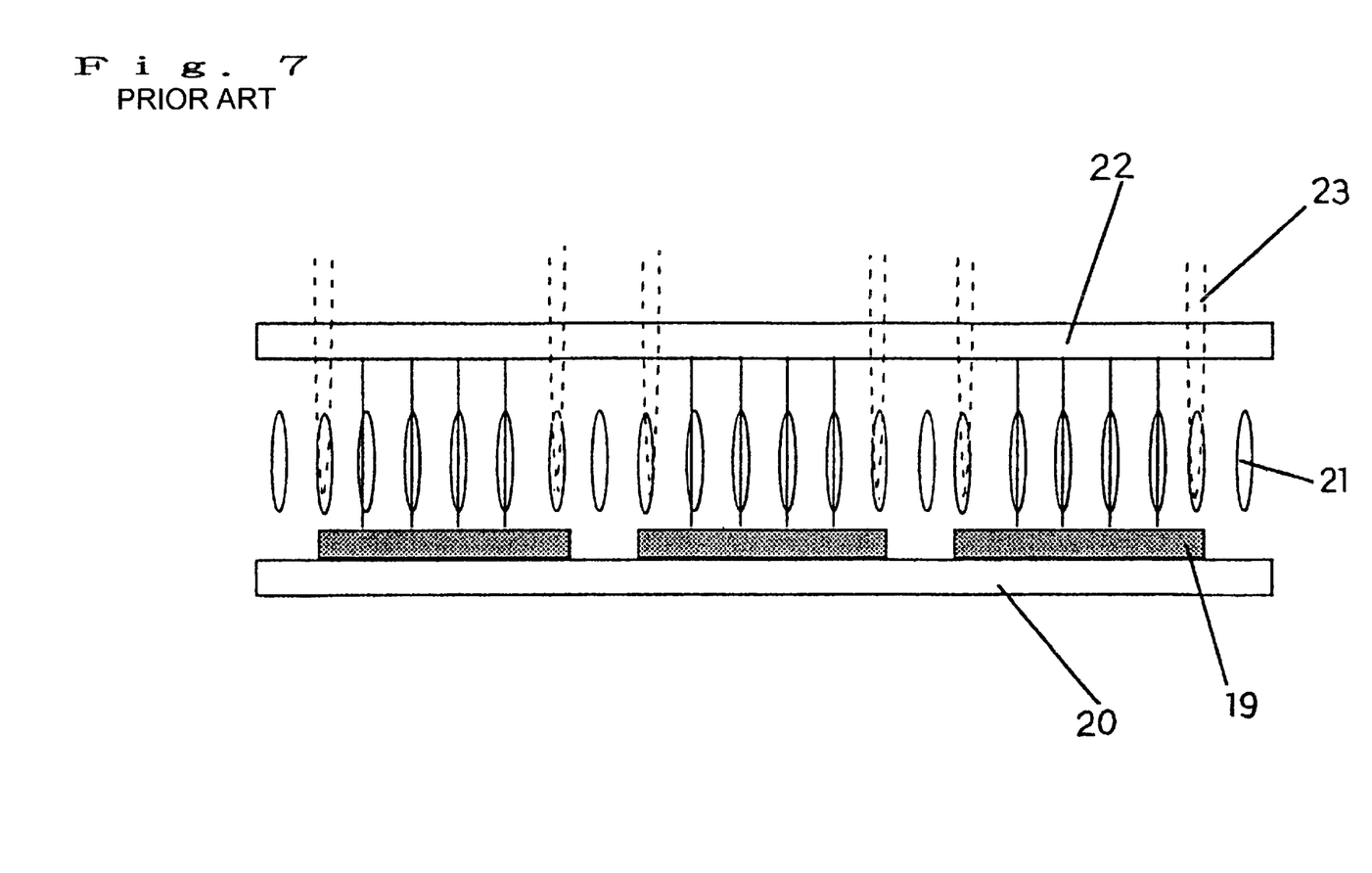
FIG. 7 is a schematic cross section showing that some leakage of light occurs around a conventional pixel.

However, as shown in FIG. 7, when a homeotropic alignment is achieved over a portion of the substrate 20 which has apixel electrode 19, that is, liquid crystal molecules 21 are aligned perpendicularly to the substrate 20, the liquid crystal molecules over the edge of the pixel electrode 19 are aligned parallel or perpendicularly to the edge of the pixel electrode 19.

Thus, while in a black display state (while no electric field is applied), the incident light around the pixel is polarized, causing some leakage of the light 23. This could have reduced the resulting contrast considerably.

In particular, for an element of reflection type, because the light passes through the liquid crystal layer twice, an outstanding leakage of light occurs around the pixel. Similarly, a remarkable leakage of light may occur when a kind of material with a large anisotropy in refractive index is used.

DISCLOSURE OF THE INVENTION

It is an object of the present invention to provide a liquid crystal device which causes no leakage of light while in a black display state with a resulting high contrast and to provide a manufacturing method thereof.

The first liquid crystal device of the present invention is a liquid crystal device comprising a first substrate which has at least rectangular or square electrodes divided into microstructures, a second substrate which has a transparent electrode, and a liquid crystal layer which is filled between said two substrates and has a negative anisotropy in dielectric constant wherein a homeotropic alignment is accomplished over said first substrate, characterized in that said alignment over said first substrate is accomplished at an angle of 40 to 50 degrees with respect to any of the edges of an electrode on said first substrate and a homeotropic alignment is accomplished over said second substrate. In an embodiment of the present invention, it is preferable that the angle formed through an alignment process is as nearly 45 degrees as possible.

The second liquid crystal device of the present invention is a liquid crystal device comprising a first substrate which has at least rectangular or square electrodes divided into microstructures, a second substrate which has a transparent electrode, and a liquid crystal layer which is filled between said two substrates and has a negative anisotropy in dielectric constant wherein a homeotropic alignment is accomplished over said first substrate, characterized in that a homogeneous alignment over said second substrate is accomplished at an angle of 40 to 50 degrees with respect to any of the edges of an electrode on said first substrate. In another embodiment of the present invention, it is preferable that the angle formed through an alignment process for the second substrate is as nearly 45 degrees as possible with respect to the edge of a pixel on the first substrate.

The third liquid crystal device of the present invention is a reflection type liquid crystal device comprising a first substrate which has at least rectangular or square reflecting electrodes divided into microstructures, a second substrate which has a transparent electrode, and a liquid crystal layer which is filled between said first and second substrates and has a negative anisotropy in dielectric constant and an anisotropy in refractive index An between 0.07 and 0.15 wherein a homeotropic alignment is accomplished over said first substrate, characterized in that said alignment over said first substrate is accomplished at an angle of 40 to 50 degrees with respect to any of the edges of an electrode on said first substrate and a homeotropic alignment is accomplished over said second substrate. In still another embodiment of the present invention, it is also preferable that the angle formed through an alignment process is as nearly 45 degrees as possible.

For any of the embodiments, such an alignment process may be accomplished by rubbing, irradiation of polarized ultraviolet light, irradiation of non-polarized ultraviolet light, or diagonal evaporation.

DESCRIPTION OF SYMBOLS

24 . . . Glass Substrate, 25 . . . Pixel Electrode, 26 . . . Liquid Crystal, 27 . . . ITO Electrode, 28 . . . Glass Substrate, 29 . . . Liquid Crystal Display Device, 30 . . . Arrow showing the Direction of a Alignment Process, 31 . . . Polarizer, 32 . . . Analyzer, 33 . . . Incident Light, 34 . . . Transmission Light, 35 . . . Liquid Crystal Molecule, 36 . . . Incident Light, 37 . . . Arrow showing the Direction of a Alignment Process, 38 . . . Substrate, 39 . . . Pixel Electrode, 40 . . . Liquid Crystal, 42 . . . Liquid Crystal Molecule, 43 . . . Polarization Axis, 44 . . . Glass Substrate, 45 . . . Transparent Conductive Film, 46 . . . Input Light Shading Film, 47 . . . p-type a-Si:H Layer, 48 . . . i-type a-Si:H Layer, 49 . . . n-type a-Si:H Layer, 50 . . . Square Pixel, 51 . . . Al ReflectingElectrode, 52 . . . Al Output Light Shading Film, 53 . . . Acrylic Resin Layer, 54 . . . Polyimide Film for Vertical Alignment, 55 . . . ITO Electrode, 56 . . . Glass Substrate, 57 . . . Polyimide Film for Vertical Alignment, 58 . . . Spherical Spacer, 59 . . . Nematic Liquid Crystal, 60 . . . Writing Light, 61 . . . Polarizer, 62 . . . Reading Light, 63 . . . Light, 64 . . . Analyzer, 65 . . . Glass Substrate, 66 . . . Al Electrode, 67 . . . Glass Substrate, 68 . . . Transparent Conductive Film, 69 . . . Vertical Alignment Film, 70 . . . Vertical Alignment Film, 71 . . . Bead, 72 . . . Resin, 73 . . . Liquid Crystal, 74 . . . Cell, 75 . . . Polarization Beam Splitter, 76 . . . Incident Light, 77 . . . Reflected Light

BEST MODE FOR CARRYING OUT THE INVENTION

Now, an embodiment of a liquid crystal display device of homeotropic type according to the present invention will be described below.

Figure 1A:
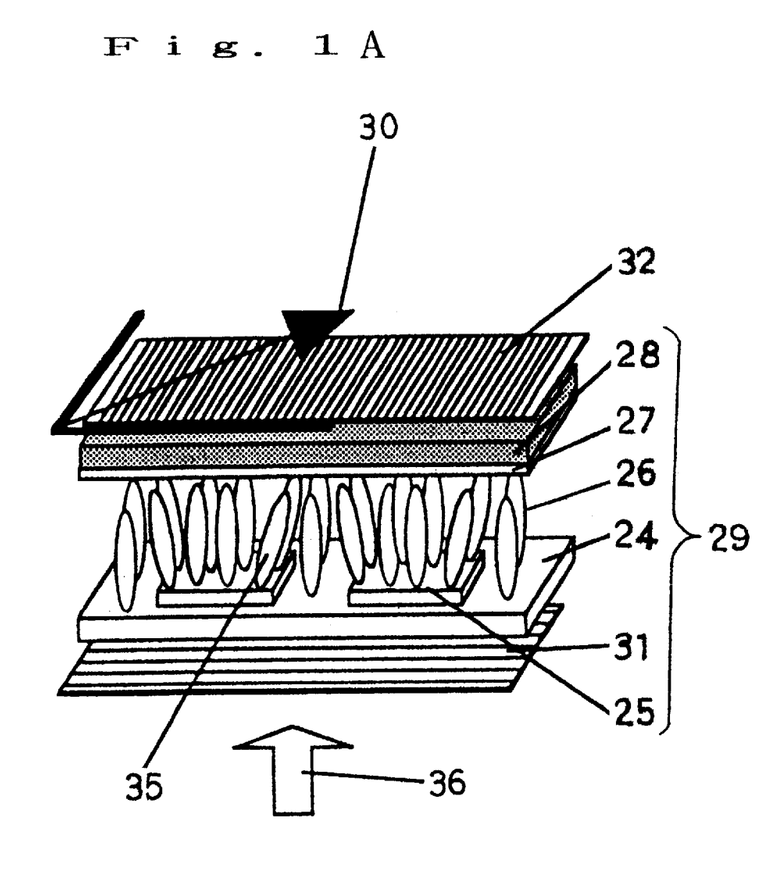
FIG. 1A is a schematic perspective view of a liquid crystal device with no electric field applied, according to the present invention.

Among the liquid crystal devices of the present invention, that of transmission type is a liquid crystal display device 29, as shown in FIG. 1A, which includes a glass substrate 24, pixel electrodes 25 aligned in a predetermined manner, liquid crystal molecules 26 with a negative anisotropy in dielectric constant, an ITO electrode 27 aligned in a predetermined manner, and a glass substrate 28 and which is subject to an alignment process such as rubbing in the direction shown by the arrow 30.

Figure 1B:
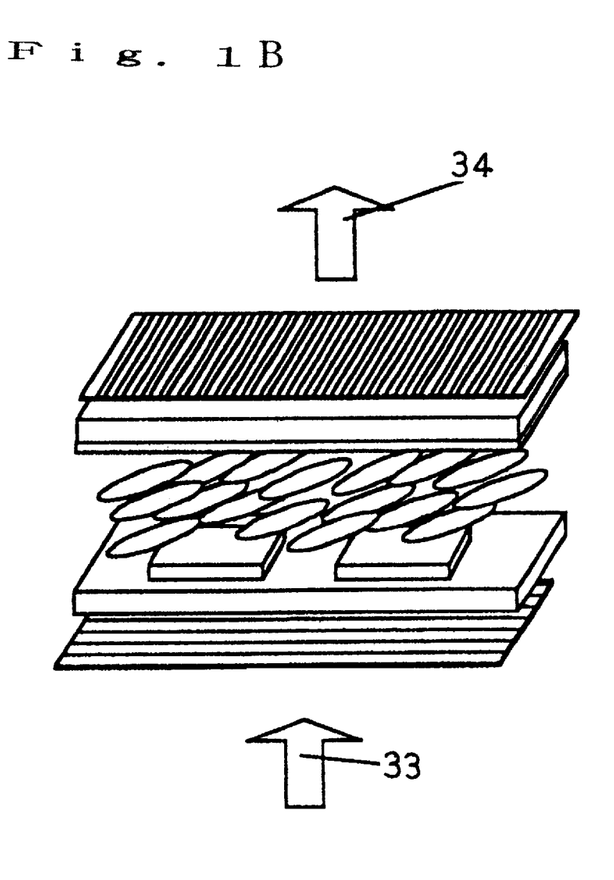
FIG. 1B is a schematic perspective view of a liquid crystal device with some electric field applied, according to the present invention.

When a polarizer 31 and an analyzer 32 are placed so that their axes are at an angle of 90 degrees with respect to each other and at an angle of 45 degrees with respect to the direction 30 of the alignment process as shown in FIG. 1A, the liquid crystal molecules 26 are tilted in the direction 30 of the alignment process as shown in FIG. 1B when a voltage is applied, and therefore, the incident light 33 is doubly refracted by the liquid crystal molecules 26 to transmit the light 34 and as a result, the display will be in a bright state.

Now, consider the case where no light is transmitted (no voltage is applied).

As shown in FIG. 1A, while no voltage is applied, any of the liquid crystal molecules 35 around the pixel electrode 25 is slightly tilted toward a direction parallel or perpendicular to the edge of the pixel. However, for the liquid crystal device 29 of the present embodiment, the direction 30 of the alignment process is set to an angle between approximately 40 and 50 degrees with respect to the edge of the pixel electrode 25.

In other words, since the optical axes of the polarizer 31 and the analyzer 32 are aligned in a direction substantially parallel or perpendicular to the edge of the pixel electrode 25, the incident light 36 is hardly subject to birefringence through the tilted liquid crystal molecules 35 around the pixel electrode 25 and cannot pass through the analyzer 32, and therefore, any leakage of light may hardly occur around the pixel electrode 25 with a very high contrast. Then, the present embodiment will be described below in detail with reference to FIG. 2.

Figure 2:
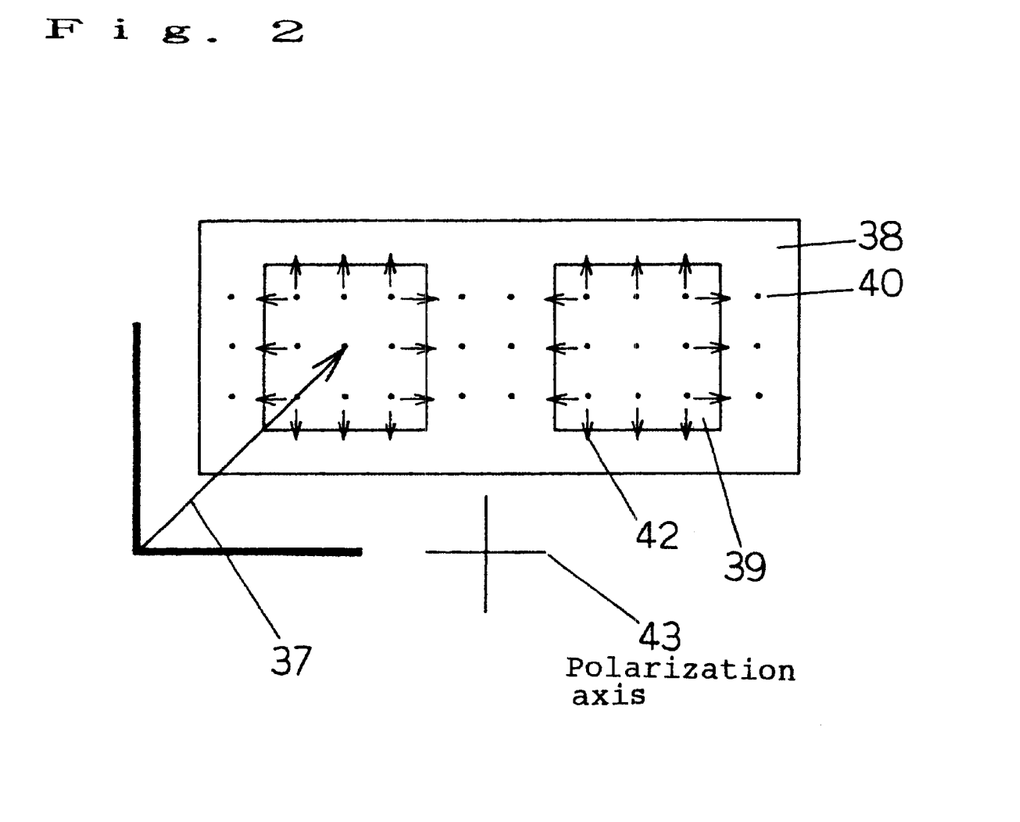
FIG. 2 is a diagram showing the direction of tilted liquid crystal molecules around a pixel of the liquid crystal device according to the present invention.

FIG. 2 is a top plan view of a liquid crystal cell according to the present embodiment. In the figure, an arrow 37 shows the direction of an alignment process, and apixel electrode 39 and a liquid crystal 40 are placed on a substrate 38, and the longitudinal axis of each liquid crystal molecule 42 slightly tilted around the pixel electrode 39 is shown by an arrow therefor.

The polarization axis 43 of two polarizers is aligned in a direction parallel or perpendicular to the edge of the pixel electrode 39 through an alignment process in the direction shown by the arrow 37. That is, while in a black display state with no voltage applied, the longitudinal axis of each liquid crystal molecule 42 around the pixel electrode 39 is tilted, and for any molecule, the axis is in a direction parallel or perpendicular to the polarization axis 43 of the polarizers, and thus, the incident light is not affected by birefringence through the irregularly aligned liquid crystal molecules 42 around the pixel electrode 39. This will eventually yield a high contrast display with no leakage of light.

It should be appreciated that the alignment process according to the present invention may be accomplished by applying an alignment film and rubbing it with cloth made of some material such as rayon, by rubbing without application of any alignment film, by ultraviolet irradiation, or by diagonal evaporation.

It has been described above that the angle for the alignment process is set to be between 40 and 50 degrees, however, it should be appreciated that an angle of 45 degrees is most preferable because the display may not be affected by birefringence with no leakage of light.

It should be also appreciated that for reflection type, a retardation in tilted liquid crystals around the pixel electrode may become very large when a material having a large anisotropy in refractive index Δn, for example, 0.07 to 0.15 is used and that any display which does not exploit the present invention may cause very much leakage of light with a resulting low contrast. Therefore, it should be apparent to those skilled in the art that the present invention is very effective.

It should be also appreciated that the present invention may bring about the same effect for a cell which has a homeotropic alignment on one substrate with pixels and a homogeneous alignment on the other substrate (that is, a hybrid type cell).

It should be further appreciated that the present invention can be effective for any of the transmission and reflection types of direct-vision display devices and projection display devices. In addition, it should be appreciated that although glass substrates have been used for the embodiments mentioned above, quarts or resin substrates may be used on the transmission side and Si wafer substrates may be used on the reflection side.

Moreover, transparent electrodes such as ITO and organic conductive film may be used for the transmission type and Al, Ag, increased reflectivity mirror, dielectric mirror, and any other electrodes having a high reflectivity may be used for the reflection type.

(Embodiment 1)

Figure 3:
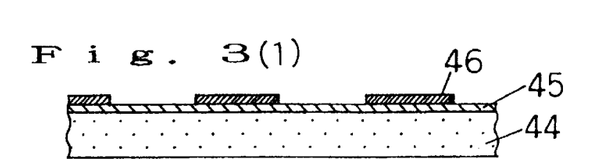
FIG. 3 shows cross sections illustrating the process steps for manufacturing a liquid crystal device according to an embodiment 1 of the present invention.

FIGS. 3 (1) through (7) are schematic cross sections illustrating the process steps for manufacturing a liquid crystal device according to the embodiment 1 of the present invention.

(1) On an optically-ground glass substrate 44 (75 mm×75 mm×1.1 mm), a transparent conductive film 45 was formed to a thickness of 1000 Å by sputtering indium tin oxide (hereinafter referred to as ITO) onto it. Then, Cr was evaporated on the surface of ITO 45 to a thickness of 500 Å and it was patterned through photolithography in a negative pattern which has substantially 18 μm-edge squares arranged at a pitch of 24 μm into a vertical delta matrix of 2783×1877. This pattern constitutes a chromium input light shading film 46.

(2) On the whole surface, three layers comprising a p-type a-Si:H layer 47 with boron added at 100 ppm (500 Å thick), an i-type a-Si:H layer 48 with no additive (1.5 μm thick), and an n-type a-Si:H layer 49 with phosphorus added at 1000 ppm (3000 Å thick) were stacked on top of each other in this order through plasma CVD to form a photoconductive layer of diode structure.

Then, Cr was evaporated on the whole surface to a thickness of 2000 Å and it was patterned through photolithography in a pattern 50 which has substantially 22 μm-edge squares arranged at a pitch of 24 μm into a vertical delta matrix of 2783×1877 (in total, 5223691 squares).

(3) The exposed portions of the a-Si:H layer between Cr square pixels 50 which serve as a mask for etching were isotropically etched through chemical dry etching using a mixture of $CF_4$ and oxygen.

When the etching process progressed to a depth of approximately 1.6 μm, grooves were formed between the Cr pixels with protruded portions of Cr serving like eaves for the grooves.

(4) An Al layer was formed on the whole surface to a thickness of 500 to 2000 Å through electron-beam evaporation.

Consequently, square Al reflection electrodes 51 of 500 to 2000 Å thick were formed on the top of the square Cr pixels 50 and an Al output light shading film 52 was formed on the bottom surface of each groove.

(5) Acrylic resin containing carbon was applied thereto through spin coating. During this process, the grooves formed by etching were filled with this resin and the Al electrodes 51 were also covered with this resin.

The whole surface was etched through reactive ion etching with oxygen to remove this resin uniformly and then this etching process finished when the surface of each Al electrode 51 was exposed.

Thus, the resin was removed completely from the surface of each Al electrode 51 but an acrylic resin layer 53 containing carbon remained within each groove.

(6) A vertical alignment polyimide film 54 was formed to a thickness of 200 Å as an alignment film. Similarly, another polyimide film 57 for vertical alignment was formed to a thickness of 200 Å on a glass substrate 56 with an ITO electrode 55 which will be the opposite substrate and then both substrates were rubbed with nylon cloth.

The direction of rubbing was at an angle of 45 degrees with respect to the edge of each pixel electrode on the polyimide film 54 and antiparallel to that angle on the other polyimide film 57.

(7) On the surface of the polyimide film 57 on the glass substrate 56 with the ITO electrode 55, $SiO_2$ spherical spacers 58 having a particle size of 2.0 μm were dispersed through a wet-spray method to stick it to the other glass substrate 44 as processed above.

The liquid crystal cell formed as described above was placed in a vacuum filling system and after pressure reduction, it was heated to a temperature of 120° C., nematic liquid crystals 59 having a negative anisotropy in dielectric constant and Δn=0.08 (manufactured by MERCK JAPAN) were filled by vacuum filling process.

(8) Writing into the homeotropic type spacial light modulator fabricated as described above was accomplished by using a writing light 60 through the glass substrate 44 and reading from that light modulator was accomplished by irradiating it with a reading light 62 which passed through a polarizer 61 placed in a position parallel or perpendicular to a certain edge of a pixel electrode and through the glass substrate 56 and by using an analyzer 64 to capture a light 63 reflected from the Al electrode 51 as an image.

As a result, no leakage of light occurred around the pixel electrodes and a contrast ratio more than 500:1 was obtained.

(Embodiment 2)

Figure 4:
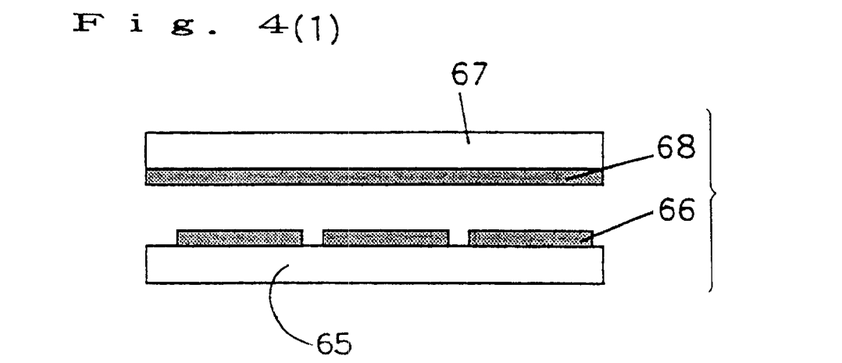
FIGS. 4 shows sections illustrating the process steps for manufacturing a liquid crystal device according to an embodiment 2 of the present invention.

FIGS. 4 (1) through (3) are schematic cross sections illustrating the process steps for manufacturing a liquid crystal device according to the embodiment 2 of the present invention.

(1) As shown in the figure, on an optically-ground glass substrate 65 (75 mm×75 mm×1.1.mm), square Al electrodes 66 were arranged into a square matrix of 1024×768 through photolithography.

On another optically-ground glass substrate 67 (75 mm×75 mm×1.1 mm), a transparent conductive film 68 was formed to a thickness of 1000 Å by sputtering ITO onto it.

(2) The substrates 65 and 67 were spin-coated with vertical alignment films 69 and 70, respectively (those films may be applied thereto through printing) and then the surface of the alignment film on the glass substrate 65 with the Al electrode 66 was rubbed with rubbing cloth made of rayon at an angle of 45 degrees with respect to a certain edge of the electrode.

Furthermore, the alignment film over the other glass substrate 67 was rubbed in a direction antiparallel to the rubbing direction for the electrode side when the cell has been assembled.

On the alignment film over the glass substrate 67, silica beads 71 of 2.0 $\mu$m were dispersed through a wet-spray method and then the alignment film was sticked to the opposed alignment film over the glass substrate 65 with resin 72.

Liquid crystals 73 having a negative anisotropy in dielectric constant were filled by vacuum filling process into a gap between the glass substrates 65 and 67 to form a homeotropic type liquid crystal cell 74 having liquid crystal molecules aligned in a direction substantially perpendicular to the substrates.

(3) When this cell 74 was observed under a crossed polarizers with the microscope placed parallel to the edge of a pixel while this cell 74 was not driven, no leakage of light could be detected around the pixel electrodes.

When the optical axis of a polarization beam splitter 75 was placed parallel to a certain edge of a pixel on the side of the glass substrate 67 and then incident light 76 came into it to project reflected light 77 onto a screen, the resulting contrast of 400:1 was obtained.

(Embodiment 3)

(1) On an optically-ground glass substrate (75 mm×75 mm×1.1 mm), rectangular Al electrodes were arranged into a square matrix of 1024×768 through photolithography.

On another optically-ground glass substrate (75 mm×75 mm×1.1 mm), a transparent conductive film was formed to a thickness of 1000 Å by sputtering indium tin oxide (hereinafter referred to as ITO) onto it.

(2) A glass substrate was spin-coated with a vertical alignment film (this film may be applied thereto through printing) and another glass substrate was covered with a homogeneous alignment film. Then, the surface of the alignment film on the glass substrate with an Al electrode was rubbed with rubbing cloth made of rayon at an angle of 45 degrees with respect to a certain edge of the electrode when the two substrates were sticked to each other but it should be noted that the rubbing was performed on the side with no Al electrode.

(3) On the alignment film over another glass substrate, silica beads of 0.2 $\mu$m were dispersed through a wet-spray mathod and then the alignment film was sticked to the opposed alignment film over the other glass substrate with resin.

(4) Liquid crystals having a negative anisotropy in dielectric constant were filled by vacuum filling process into a gap between the two glass substrates to form a hybrid type liquid crystal cell having liquid crystal molecules on the side of the Al electrode glass substrate aligned in a direction substantially perpendicular to the substrate and liquid crystal molecules on the side of the other glass substrate aligned in a direction substantially parallel to the substrate.

(5) When this cell was observed under crossed polarizers with the microscope placed parallel to the edge of a pixel while this cell was not driven, no leakage of light could be detected around the pixel electrodes.

(6) When the optical axis of a polarization beam splitter was placed parallel to a certain edge of a pixel on the side of the glass substrate with no Al electrode and then incident light came into it to project reflected light onto a screen, the resulting contrast of 320:1 was obtained.

INDUSTRIAL APPLICABILITY

From the foregoing, the present invention is applicable to homeotropic or hybrid alignment liquid crystal devices of any type of transmission and reflection or direct-vision and projection, and in particular, the present invention can advantageously eliminate almost any leakage of light which would otherwise occur around pixels in the prior art and therefore, provide an improved contrast by rubbing the surface in a direction at an angle of 40 to 50 degrees with respect to any of the edges of a square or rectangular electrode and by placing a polarizer in an appropriate position.

What is claimed is:

1. A liquid crystal device comprising a first substrate which has at least rectangular or square electrodes divided into microstructures, a second substrate which has a transparent electrode, and a liquid crystal layer which is filled between said two substrates and has a negative anisotropy in dielectric constant wherein a homeotropic alignment is accomplished over said first substrate, characterized in that another alignment over said first substrate having said homeotropic alignment is accomplished at an angle of 40 to 50 degrees in the plane of the first substrate with respect to any of the edges of an electrode on said first substrate to tilt molecules of the liquid crystal layer in a direction of 40 to 50 degrees in the plane of the first substrate, and a homeotropic alignment is accomplished over said second substrate, wherein in an orthogonal X,Y,Z axes, the plane of the first substrate having a longitudinal dimension is formed in the X,Y axes and a thickness dimension of the first substrate is formed in the Z axis, and the tilt of the molecules at the angle of 40 to 50 degrees is measured in the plane formed in the X, Y axes with respect to any of the edges formed along the X or Y axis.

2. The device of claim 1 wherein the alignment of the molecules in the direction of 40 to 50 degrees in the plane of the first substrate is independent of an amount of pretilt in the molecules.

3. A method of manufacturing a liquid crystal device comprising the steps of:

accomplishing over a first substrate which has at least rectangular or square electrodes divided into microstructures, an alignment at an angle of 40 to 50 degrees in the plane of the first substrate with respect to any of the edges of an electrode on said first substrate to tilt molecules of the liquid crystal layer in a direction of 40 to 50 degrees in the plane of the first substrate, wherein in an orthogonal X,Y,Z axes, the plane of the first substrate having a longitudinal dimension is formed in the X,Y axes and a thickness dimension of the first substrate is formed in the Z axis, and the tilt of the molecules at the angle of 40 to 50 degrees is measured in the plane formed in the X, Y axes with respect to any of the edges formed along the X or Y axis, accomplishing a homeotropic alignment over a second substrate which has a transparent electrode, and forming a liquid crystal layer between said first and second substrates which has a negative anisotropy in dielectric constant.

4. A liquid crystal device comprising a first substrate which has at least rectangular or square electrodes divided into microstructures, a second substrate which has a transparent electrode, and a liquid crystal layer which is filled between said two substrates and has a negative anisotropy in dielectric constant wherein a homeotropic alignment is accomplished over said first substrate, characterized in that a homogeneous alignment over said second substrate is accomplished at an angle of 40 to 50 degrees in the plane of the first substrate with respect to any of the edges of an electrode on said first substrate to tilt molecules of the liquid crystal layer in a direction of 40 to 50 degrees in the plane of the first substrate, wherein in an orthogonal X,Y,Z axes, the plane of the first substrate having a longitudinal dimension is formed in the X,Y axes and a thickness dimension of the first substrate is formed in the Z axis, and the tilt of the molecules at the angle of 40 to 50 degrees is measured in the plane formed in the X, Y axes with respect to any of the edges found along the X or Y axis.

5. A method of manufacturing a liquid crystal device comprising the steps of:

accomplishing a homeotropic alignment over a first substrate which has at least rectangular or square electrodes divided into microstructures, accomplishing over a second substrate which has a transparent electrode, a homogeneous alignment at an angle of 40 to 50 degrees in the plane of the first substrate with respect to any of the edges of an electrode on said first substrate to tilt molecules of the liquid crystal layer in a direction of 40 to 50 degrees in the plane of the first substrate with respect to any of the edges of an electrode on said first substrate, wherein in an orthogonal X,Y,Z axes, the plane of the first substrate having a longitudinal dimension is formed in the X,Y axes and a thickness dimension of the first substrate is formed in the Z axis, and the tilt of the molecules at the angle of 40 to 50 degrees is measured in the plane formed in the X, Y axes with respect to any of the edges fanned along the X or Y axis, and forming a liquid crystal layer between said first and second substrates which has a negative anisotropy in dielectric constant.

6. A reflection type liquid crystal device comprising a first substrate which has at least rectangular or square reflecting electrodes divided into microstructures, a second substrate which has a transparent electrode, and a liquid crystal layer which is filled between said first and second substrates and has a negative anisotropy in dielectric constant and an anisotropy in refractive index $\Delta n$ between 0.07 and 0.15 wherein a homeotropic alignment is accomplished over said first substrate, characterized in that another alignment over said first substrate having said homeotropic alignment is accomplished at an angle of 40 to 50 degrees with respect to any of the edges of an electrode on said first substrate and a homeotropic alignment is accomplished over said second substrate.

7. A method of manufacturing a reflection type liquid crystal device comprising a first substrate which has at least rectangular or square reflecting electrodes divided into microstructures, a second substrate which has a transparent electrode, and a liquid crystal layer which is filled between two substrates, such as said first and second substrates and has a negative anisotropy in dielectric constant and an anisotropy in refractive index $\Delta n$ between 0.07 and 0.15 wherein a homeotropic alignment is accomplished over said first substrate characterized in that another alignment over said first substrate having said homeotropic alignment is accomplished at an angle of 40 to 50 degrees with respect to any of the edges of an electrode on said first substrate and a homeotropic alignment is accomplished over said second substrate.

* * * * *

UNITED STATES PATENT AND TRADEMARK OFFICE
CERTIFICATE OF CORRECTION

PATENT NO.    : 6,452,655 B1                                              Page 1 of 1
DATED         : September 17, 2002
INVENTOR(S)   : Nishiyama et al.

It is certified that error appears in the above-identified patent and that said Letters Patent is hereby corrected as shown below:

<u>Title page, Item [54] and Column 1, lines 1 and 2,</u>
Please delete the title "LIQUID CRYSTAL DEVICE AND ITS MANUFACTURING METHOD" and substitute therefor -- HOMEOTROPIC AND HYBRID ALIGNMENT TYPES OF LIQUID CRYSTAL DISPLAYS AND A MANUFACTURING METHOD THEREOF --.

<u>Column 9,</u>
Line 43, delete the word "found" and substitute therefor -- formed --.

<u>Column 10,</u>
Line 14, delete the word "fanned" and substitute therefor -- formed --.

Signed and Sealed this

Twenty-seventh Day of May, 2003

JAMES E. ROGAN
*Director of the United States Patent and Trademark Office*